United States Patent Office 3,356,450
Patented Dec. 5, 1967

3,356,450
PROCESS FOR THE PRODUCTION OF
MOLECULAR SIEVE GRANULES
Gerhard Heinze, Schildgen, Germany, assignor to Farbenfabriken Bayer Aktiengesellschaft, Leverkusen, Germany, a corporation of Germany
No Drawing. Filed Dec. 24, 1964, Ser. No. 421,106
Claims priority, application Germany, Jan. 4, 1964,
F 41,673
6 Claims. (Cl. 23—112)

The present invention relates to the production of hard, substantially pure molecular sieve granules, which are free of binders.

Molecular sieve zeolites are widely used as adsorption agents in many fields of technology. This is due on the one hand to their exceptional efficiency as drying agents and on the other hand to their high selectivity, for the performance of large scale separation processes. These separation processes could not be carired out with the hitherto customary adsorption agents such as silicia gels, aluminum oxides or active carbons.

The synthetic crystalline molecular sieve zeolites obtained in powder form have to be formed into granules for use as adsorption agents. The binders generally used for this purpose are clay minerals such as kaolin, bentonite and attapulgite. Other proposals concern binding with gelatinous aluminum hydroxide, with waterglass, with silicic acid esters which are gradually hydrolyzed to silicic acid gel, and with aqueous silicic acid sols. It is even possible to produce pearl-shaped molecular sieve granules with the last mentioned binder. In granulation, it is generally desired to obtain hard formed particles with the lowest possible content of binders to get granules with high adsorption capacity. Binder contents of 15 to 25% generally are employed.

Apart from the quantity, the type of binder is also important in numerous applications. Thus, for example, bentonitic binders are disadvantageous in the treatment of olefine-containing substrates because they catalyze olefine polymerization. Additionally in carrying out selecitve separations, the non-specific self-adsorption of a binder tends to impair the sharp separation which can be achieved with the pure crystalline zeolite present. The preservation of the high selectivity in the bounded and shaped molecular sieves is therefore another reason for keeping the quantity of the binding material as low as possible.

The production of substantially binder-free formed particles consisting entirely of molecular sieve zeolites has also become known. For example, activated kaolin, i.e. a kaolin that has been converted into amorphous reactive metakaolin by heat treatment, can be pressure moulded into formed particles with concentrated sodium hydroxide, and these particles are crystallized hydrothermally to form zeolite in the presence of dilute sodium hydroxide. In another process, pulverulent metakaolin is worked up with highly concentrated sodium hydroxide to yield an approximately dry mass; after heating the mixture is then ground, mixed with water to form a paste and subjected to a shaping process. Finally the shaped particles are heated until dry, i.e. in the absence of a liquid phase, to convert them into a zeolite. In large units, however, the heat transfer represents a difficult problem in this process.

Alternatively, reaction mixtures of concentrated sodium aluminate solution, reactive silicic acid and sodium hydroxide are pressure moulded to produce shaped particles and again these are crystallized to zeolite by heat treatment in the absence of a liquid phase. In all these processes, it is desired to produce by crystallization mainly zeolite A which is by far the most important molecular sieve zeolite, but hitherto it was not possible to obtain moulded particles having the complete adsorption capacity characteristic of pure, pulverulent zeolite A.

It is therefore an object of the present invention to provide a process for the production of shaped molecular sieves having the whole adsorption capacity of the pulverulent zeolitic material.

It is another object of the present invention to provide a process for the production of shaped molecular sieves being hard and abrasion resistant.

It is still another object of the present invention to provide a process for the production of molecular sieve pearls, which consist of pure zeolite.

Still further objects will become apparent as the following description proceeds.

The present invention relates to a process for the production of shaped molecular sieve particles from shaped molecular sieve materials having increased adsorption capacity bound with silicic acid, wherein the shaped particles are treated at temperatures of about 15 to 100° C. with an aqueous solution containing at least 0.4 mol of $Al_2O_3$ in the form of aluminate and at least 1.5 mols of NaOH per mol of binder, calculated on the $SiO_2$-content of said binder.

In contrast to the processes hitherto known, the process according to the invention starts with molecular sieve granules which are bound with silicic acid and which are converted by simple after-treatment with aqueous solutions into practically binder-free shaped molecular sieve particles having excellent adsorption capacities and large resistance to abrasion.

The molecular sieve granules bound with silicic acid used as starting material for the new process may be produced by any known method, e.g. by the process according to French patent specification 1,339,733. It is especially advantageous to use the pearly granules produced by the process according to Belgian patent specification 621,484 because binder-free pearly molecular sieves can be obtained from these pearls by the new process. The pearl form is generally the preferred form for adsorption agents because of their low flow resistance and, owing to the absence of any edges, pearls have the least abrasion. It is an advantage of the new process that it is possible in contrast to the processes hitherto known to produce shaped molecular sieve particles in pearl form completely free from a binder.

By the known processes it is possible, using mainly mineral containing silicic acid and alumina as starting materials and possibly molecular sieve powder in admixture, to produce extrusion moulded or granulated formed particles which then, while retaining their shaped form, are crystallized hydrothermally to yield structures consisting mainly of molecular sieves. It is well understandable that the conditions for these known processes owing to the long diffusion paths of the soluble components into the interior of the moulded particles are much more difficult to control than for the homogeneous, stirred mixtures employed in the process of invention. In fact, the high adsorption efficiency known from pure, pulverulent crystalline zeolites is not obtained in such polycrystalline moulded particles.

In contrast to aforementioned difficulties it is possible by the new process to produce shaped molecular sieve particles, preferably pearls, which consist of pure zeolite.

As starting materials shaped particles of silica bounded molecular sieves containing preferably 70 to 90% by weight of pure crystallized molecular sieve zeolite are used. The zeolite contained in these particles can be prepared by any desired process. For example, finely divided mineral substances such as metakaoline can be hydrolyzed with sodium hydroxide and crystallized hydrothermally in homogeneous suspension to give zeolite. Alternatively, the standard process suitable for obtaining the widest variety of zeolite types is employed, which process consists in precipitating an aluminosilicate gel from pure solutions (e.g. sodium silicate solution, sodium aluminate solution and sodium hydroxide) and the hydrothermal crystallization thereof in homogeneous suspensions. Since in this process the reaction conditions can be controlled in a well defined manner the formation of completely pure zeolite crystals of a certain type and grain size can be promoted. Moreover the occurrence of impurities due to the presence of non-decomposable subsidiary constituents (feldspars, quartz) in the raw material is impossible since solutions are used as starting materials and therefore zeolites with the highest adsorption rates are obtained. It is an advantage of the new process that shaped molecular sieve particles bound with silicic acid, which particles consist, apart from the binder, entirely of such high quality molecular sieve crystals, can be converted by it into binder-free formed particles of correspondingly high quality. In this processes, only the relatively small proportion of zeolite produced with utilization of the $SiO_2$ of the binder is crystallized in situ i.e. in the interior of the granules. It has been found that the crystallization of this residual quantity of molecular sieve is promoted considerably by the multiple amount of finished, well-formed zeolite crystals present.

It is very surprising that in spite of the disappearance of binder in the shape particles, the cohesion between the crystals of the pulverulent zeolite is not lost. It was in itself to be expected that this after-treatment of the formed particles would cause them to revert to the powder form. The only possible explanation for the fact that no disintegration occurs is that the $SiO_2$ bound to the surface of the zeolite crystal is converted in situ into crystalline zeolite, whereby particles already present continue growing to larger units.

Surprisingly it was observed that after the treatment according to the new process, the shaped particles have a considerably higher strength than the binder-containing particles used as starting materials, even in the wet state. Another advantage is the increase in bulk density, amounting to about 10 to 20%.

Preferably, pearl-shaped molecular sieve particles bound with silicic acid are used as starting material, these particles being obtained by stirring pulverulent molecular sieve zeolites with aqueous silica sol to form a runny suspension which is then mixed with comparatively small quantities of a second suspension of finely divided magnesium oxide in water, and distributing the still runny mixture of the two suspensions which is capable of gel formation, in droplet form in a liquid immiscible with water until sol-gel conversion occurs, the solidified pearls then being separated by a screen device and dried.

In carrying out the process for the production of the starting material—the silical bounded pearls of zeolites—the powdery zeolite to be granulated is mixed with an aqueous silica sol (advantageously of 15-40% by weight of $SiO_2$-content) to form a flowable suspension of pH 8-10. A similar aqueous suspension of hydrated magnesium oxide is also prepared by suspending finely divided magnesium oxide. It is advisable to allow this suspension to stand for at least one hour before use so that the oxide can be hydrated. The two suspensions are then mixed homogeneously in a suitable proportion in a through-flow vessel provided with a high-speed stirrer or another mixing arrangement so that immediately thereafter the mixture can flow through a nozzle into an organic liquid, in which the stream is split up into drops. The residence time of the drops in the organic phase is so chosen that the gelling process is initiated during this time and the gell balls which are formed have achieved the stability necessary for the after-treatment on leaving the organic phase.

Special molecular sieve granules with a high density and low content of binding agent can be produced according to this process. Thus, in a first step, the zeolite material can be mixed with water or a part of the silica sol used as binding agent to form a crumbly mass. In a second step this mass is treated as described above. Zeolite aggregates are formed having a particle diameter of above $10\mu$ and which are not divided into smaller particles when granulated as described below.

Although the zeolite-silica sol suspension must have a pH of 8 to 10, the actual pH may differ from case to case. The pH may be adjusted by adding acid and the actual pH depends on various factors such as concentration, specific surface and electrolyte content of the sol as well as the quantity and nature of the zeolite and the properties of the magnesium oxide suspension to be added for gelling purposes. For example, the possible pH range is between pH 8.2 and pH 8.8 when using zeolite 4A and a substantially electrolyte-free 30% silica sol, having a specific surface according to Brunauer, Emmet-Teller (BET) of about 200 $M^2/g.$, in a mixing ratio sufficient to give a zeolite content of the subsequently dehydrated granules of 70% by weight. If the zeolite suspension is made less alkaline, then it would not show the necessary stability, but would gradually change into a soft jelly. On the other hand, with only a slightly higher pH, the gelling agent (i.e. the magnesium oxide) used in the process entirely loses its efficacy. A clear explanation of this cannot be provided at the present time, since no clear conception exists concerning the mechanism of this peculiar process of the gelling of silica sols with insoluble magnesium oxide. However, it is important that it is possible, within the aforementioned pH range, by choosing the conditions (and more especially the quantity of magnesium oxide used) to control the gelling process in such a way that the solidification of the liquid suspension occurs suddenly after in an incubation time of a few seconds up to several minutes.

Silica sols prepared by various methods and having a specific surface according to BET of 150–400 $m.^2/g.$ are preferred for the granulating process provided that they contain at least 10% by weight of $SiO_2$. For example, a 15% sol produced by peptizing silica gel and having a specific surface of 200 $m.^2/g.$ can be used for the process. However, it is advantageous to use those silica sols which are produced by ion exchange treatment of dilute waterglass solutions and subsequent alkali stabilization. By comparison with the sols obtained by other processes these sols have particularly low contents of impurities and consequently have an astonishing stability. Such a sol with a surface of 200 $m.^2/g.$ can for example be evaporated at atmospheric pressure to a content of 40% by weight. The normal commercial cloudy silica sol with surfaces of 100 $m.^2/g.$ are unsuitable, since they produce soft granulated materials.

Sols with a high $SiO_2$-content are used in the process for the production of granulated materials of high bulk density, while more dilute sols produce granules of lower specific gravity and particularly high porosity.

The magnesium oxide is preferably used in the form of a thermally decomposed finely divided basic magnesium carbonate, having at least a specific surface area of 20 $m.^2/g.$ according to BET. For the gelling of the silica sol zeolite suspension with the $Mg(OH)_2$-suspension both components are mixed in a ratio of $MgO:SiO_2$ of between 1:3 and 1:200, preferably of between 1:5 and 1:50 on the weight basis, whereby in the aforementioned ratios the $SiO_2$-content only of the silica sol is to be regarded.

The shaped molecular sieve particles bound with silicic acid are best used in the air dry state. The air dry shaped particles are introduced into an aluminate solution containing alumina and alkali metal hydroxide. The concentration of aluminate is preferably 0.5 to 2.0 mols of $Al_2O_3$ per liter, in order to keep the volume of the treatment solution low. The quantity of aluminate solution is calculated so that there will be at least 0.4 sol of $Al_2O_3$ per 1 mol of $SiO_2$-binder, an excess being harmless even if it is many times this stated quantity. Generally per mol $SiO_2$-binding agent 0.4 to 5.0 mols of $Al_2O_3$, preferably 0.5 to 1.0 mol of $Al_2O_3$ are used. The concentration of alkali metal hydroxide may vary from 1.5 to 10 mols per liter depending on the temperature of the treatment. The lower concentrations are suitable for treatment at higher temperatures and conversely higher concentrations are suitable for treatment at lower temperatures. Generally per mol $SiO_2$-binding agent 1.5 to 100 mols NaOH and preferably 1.5 to 20 mols NaOH are used.

Sodium aluminate solutions and sodium hydroxide solutions are used for the after-treatment of shaped particles of the molecular sieves sodium zeolite A and sodium zeolite X, and potassium aluminate solution and potassium hydroxide solution are used for potassium zeolites. Binder-free shaped particles of calcium zeolite, e.g. the technically important calcium zeolite A, can be produced from the corresponding binder-free shaped sodium zeolite particles by subsequent ion exchange with $CaCl_2$-solution according to well known practice.

Since the dissolved components have long diffusion paths to cover in the interior of the shaped particles and the reaction with the locally fixed $SiO_2$ also proceeds slowly, sufficient time is necessary for completing the reaction. At temperatures of, for example, 15 to 25° C., practically 0.5 mol of $Al_2O_3$ is bound by one mol of binder $SiO_2$ within 24 hours, whereas 3 to 5 hours are sufficient for this reaction at 50° C., depending on the diameter of the granules. Towards the end of the treatment, the temperature preferably is increased to 80 to 100° C. to accelerate formation of the crystalline zeolite phase. Shaped particles consisting quantitatively of crystalline zeolite can be obtained in this way in a period of 5 to 10 hours. But even at lower temperatures it is possible, provided the reaction time is long enough, to obtain completely crystallized formed zeolite particles, e.g. in 24 hours at 50° C. As outlined above temperatures of between 15 and 100° C. are applicable, whereby temperatures of 40 to 80° C. are preferred.

The granules are treated by leaving them to stand covered with the aluminate solution at the appropriate temperature, mechanical stirring of the granules being neither necessary nor advantageous. On the other hand, in the treatment of large batches it is advisable to circulate the treatment liquid in a very slow stream by means of a circulating pump through the layer of granules arranged in a column provided with a screen base. The temperature can then easily be regulated by a heat exchanger built into the conduit of the pump.

*Example 1*

1000 g. of air-dried pearl-like granules of sodium zeolite A of sieve fraction 2 to 4 mm., prepared according to Belgian patent specification 608,291, are used as starting material. In the air dry state, the pearl-like granules contain 17% $H_2O$ and 83% anhydrous substance and have a binder content of 15% calculated on the anhydrous substance. The pearl-like granules used thus contain 1000.0.83.0.15 g.=124 g.(=2.1 mols) of $SiO_2$-binder.

The granules are treated for 24 hours in the cold with 2.1 liters of a solution which has a 0.85 molar concentration of $Al_2O_3$ and a 7.6 molar concentration of NaOH. During this time, 0.84 mol of $Al_2O_3$ from the solution was bound by the granules. The solution was then diluted with 3.9 liters of $H_2O$ to an approximately 2.7 molar concentration of NaOH and heated for 5 hours at 80° C., a further 0.17 mol of $Al_2O_3$ from the solution being used up in the process. Very hard pearl-like granules of bulk density (anhydrous) 760 g./l., compared with 650 g./l. in the starting product, are obtained in the wet state.

The $H_2O$ equilibrium charge of these pearl-like granules is compared below with that of the granules put into the reaction prior to the aluminate treatment and with the values of the pulverulent molecular sieve zeolite used for the preparation of the starting granules.

| | $H_2O$ uptake (g. $H_2O$/100 g. anhydrous granules) at 25° C. and a partial pressure of $H_2O$ of (percent mm. Hg)— | | | |
|---|---|---|---|---|
| | 0.1 | 1 | 4.5 | 10 |
| (a) Granules after the aluminate treatment | 17.3 | 20.6 | 22.3 | 23.8 |
| (b) Granules before the aluminate treatment | 15.5 | 18.6 | 19.2 | 20.7 |
| (c) Pulverent zeolite | 17.6 | 20.2 | 22.4 | 23.1 |

From this it can be seen that absorption capacity of the granules produced according to the invention is practically as high as that of the original pulverulent zeolite. The latter was prepared from a kaolin which contained approximately 5% of feldspar.

*Example 2*

1000 g. of another air dry pearl-like granules produced according to Belgian patent specification 608,291, which contained, calculated on the anhydrous substance, 15% of binder and 85% of a completely pure sodium zeolite A prepared from solutions are treated as in Example 1. The absorption capacity of the pearly zeolite originally used is again achieved by the granules which have been after-treated according to the invention with aluminate solution.

| | $H_2O$ uptake (g. $H_2O$/100 g. anhydrous granules) at 25° C. and a partial pressure of $H_2O$ of (percent mm. Hg)— | | | |
|---|---|---|---|---|
| | 0.1 | 1 | 4.5 | 10 |
| (a) Pearl-like granules after the aluminate treatment | 18.0 | 20.8 | 22.8 | 24.2 |
| (b) Pearl-like granules before the aluminate treatment | 16.3 | 18.7 | 20.8 | 22.9 |
| (c) Pulverulent zeolite | 18.9 | 21.4 | 22.9 | 23.8 |

*Example 3*

20 g. of pearly granules bound with silicic acid as described in Example 1 are treated for 24 hours at 50° C. with 24 ml. of a solution which has a 1.0 molar concentration of $Al_2O_3$ and a 6.1 molar concentration of NaOH. The water uptake of the hardened pearl-like granules at 10 mm. Hg is 22.8% as compared with 20.7% in the granules before the treatment.

*Example 4*

1.170 g. of the binder-free pearly granules of sodium zeolite type A produced according to Example 1 and after-treated with aluminate is treated for one hour at 70° C. with 2.5 liters of a 0.5 molar solution of $CaCl_2$, the solution is discarded and the granules are treated for a further 5 hours at 70° C. with 2.5 liters of a molar solution of $CaCl_2$. In the course of this reaction, about 64% of the sodium ions are replaced by calcium ions; binder-free pearly granules of calcium zeolite type A having a pore size of 5 A. units are formed. At 0° C. and 600 mm. Hg the product absorbs 22.5 ml. of $N_2$/g. of anhydrous granules as compared with 19.0 ml. of $N_2$/g. in the case of a calcium zeolite A prepared from the starting granules not treated with aluminate by ionic exchange with $CaCl_2$-solution.

I claim:

1. Process for the production of substantially pure crystalline molecular sieve zeolite granules comprising forming granules comprising molecular sieve particles bound with silicic acid, treating said silicic acid bonded molecular sieve granules at temperatures of between 15 and 100° C. with an aqueous solution containing at least 0.4 mol of $Al_2O_3$ as alkali metal aluminate and at least 1.5 mols of alkali metal hydroxide per mol of binding agent calculated as $SiO_2$ whereby said binder is converted to molecular sieve particles of a composition identical to the composition of said molecular sieve particles, and whereby said granules consisting substantially of said molecular sieve composition are produced.

2. Process according to claim 1, wherein said silicic acid bonded molecular sieve granules are treated at temperatures of between 40 to 80° C.

3. Process according to claim 1, said silicic acid bonded molecular sieve granules are prepared from sodium zeolite A and wherein said alkali metal aluminate is sodium aluminate and said alkali metal hydroxide is sodium hydroxide.

4. Process according to claim 1, wherein said silicic acid bonded molecular sieve granules are pearl-like granules produced according to the following steps:
 (a) preparing a suspension of a pulverous molecular sieve material in an aqueous silica sol having a $SiO_2$ content of at least 10% by weight and when dried yielding silica having a specific surface area of between 150 to 400 m.²/g. according to BET, said suspension having a pH of between 8.0 and 10.1.
 (b) mixing said suspension with an aqueous suspension containing finely divided magnesium oxide, said magnesium oxide having a specific surface area of at least 20 m.²/g. according to BET, whereby said two suspensions are mixed in an amount to yield an $MgO:SiO_2$-ratio of between 1:3 to 1:200, the $SiO_2$ in said ratio being calculated on the $SiO_2$ content of the silica sol.
 (c) introducing the mixture obtained in step (b) dropwise into an organic liquid immiscible with water and separating the resultant pearl-like granules from said organic liquid.

5. Process according to claim 1, wherein said silicic acid bonded molecular sieve granules are treated with an aqueous solution containing 0.5 to 1 mol of $Al_2O_3$ as alkali metal aluminate and 1.5 to 20 mols of alkali metal hydroxide per mol of binding agent calculated as $SiO_2$.

6. Process as claimed in claim 1, wherein said $Al_2O_3$ is present in a proportion of about 0.4 to 5.0 mols and said alkali metal hydroxide is present in a proportion of about 1.5 to 100 mols per mol of binding agent calculated as $SiO_2$.

References Cited

UNITED STATES PATENTS

| | | | |
|---|---|---|---|
| 3,094,383 | 6/1963 | Dzierzanowski et al. | 23—112 |
| 3,119,660 | 1/1964 | Howell et al. | 23—112 |

FOREIGN PATENTS

| | | |
|---|---|---|
| 1,339,733 | 9/1963 | France. |

OSCAR R. VERTIZ, *Primary Examiner.*

B. HENKIN, E. J. MEROS, *Assistant Examiners.*